United States Patent Office 3,463,507
Patented Aug. 26, 1969

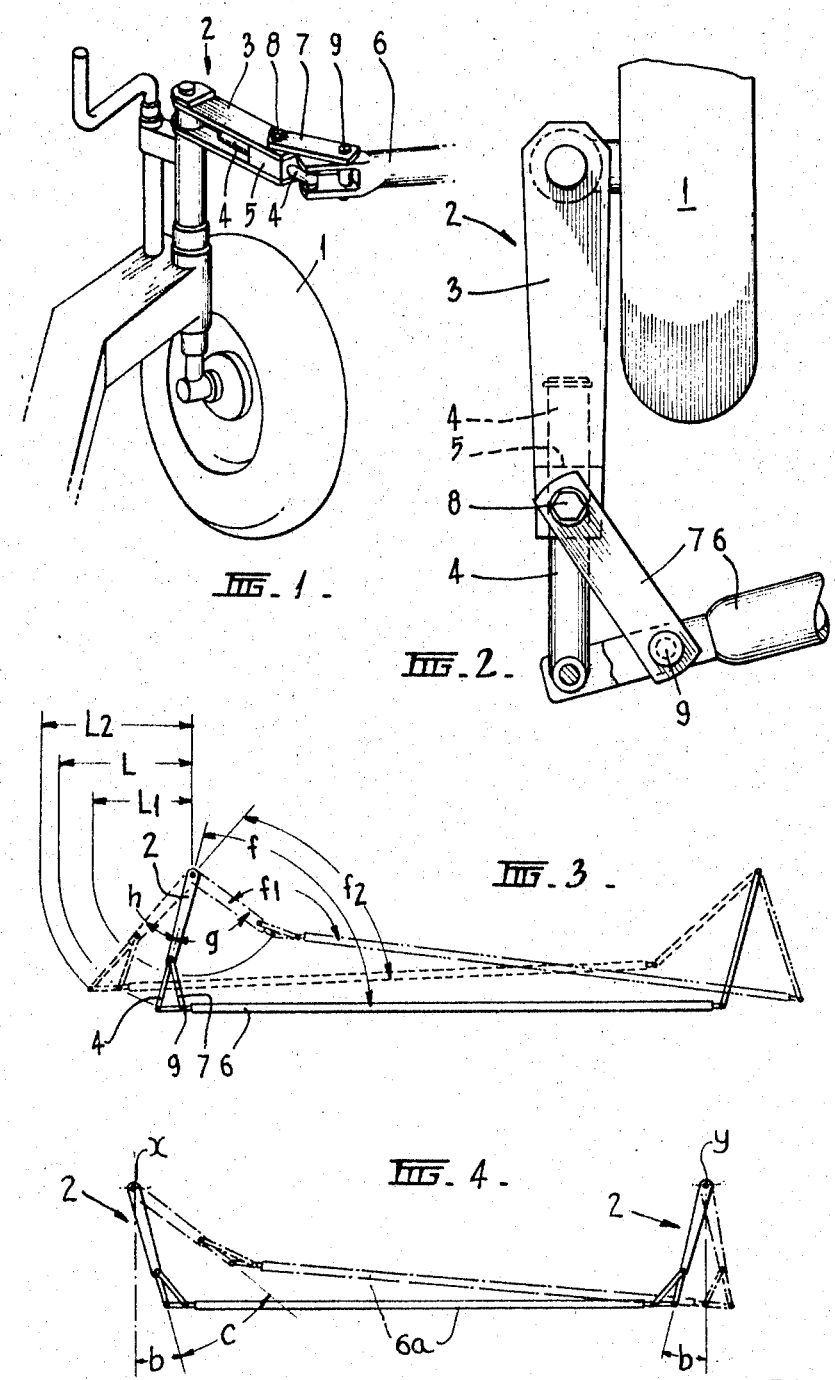

3,463,507
STEERING LINKAGE FOR TRAILING AGRICULTURAL IMPLEMENTS
James F. Butler, Belmont, Geelong, Victoria, Australia, assignor to International Harvester Company, Chicago, Ill., a corporation of Delaware
Filed Apr. 20, 1967, Ser. No. 632,349
Claims priority, application Australia, Apr. 21, 1966, 4,563/66
Int. Cl. B62d 7/16, 9/00
U.S. Cl. 280—103                     14 Claims

ABSTRACT OF THE DISCLOSURE

A steering linkage, for trailing or powered wheeled vehicles, attached to a pair of wheels mounted for steering movement about respective vertical axes wherein at least one steering arm is telescopic whereby the length of the telescopic steering arm is increased as the included angle between it and the fixed length tie rod decreases such that correct steering along a smaller turning circle is imparted particularly in one predetermined direction of turning.

---

This invention relates to steering linkage for wheeled vehicles and particularly, but not exclusively, to agricultural implements, such as the trailing plough.

In order that the tires of any multi-wheeled machine are not subjected to scuffing during turning of the machine, it is essential that, at any angle of turn, the axes of all the wheels should intersect at a common point known as the "instantaneous centre of turning." In practice, this is achieved by having one or more of the wheels fixed on a common axis normal to the direction of straight-ahead travel, and connecting the remaining wheels by a suitable linkage which causes them to turn in such a manner that the locus of the intersection of their axes, approximates the common axis of the fixed wheel or wheels. For this to occur, it is necessary that the innermost wheel of the turn be subjected to an angular steering movement greater than the outermost wheel.

In the past, this requirement has been achieved by a steering linkage known as "Ackerman Steering" and has been applied to road vehicles and agricultural implements, such as ploughs and other machines. In the "Ackerman Steering," each steerable wheel pivots about a vertical axis and carries a steering arm of fixed length, the steering arms being connected by a tie rod. The arms are fixed to the wheel pivots so as to be inwardly inclined to the normal to the common centre-line of the wheel pivots, whereby on turning, the steering arm of the outermost wheel moves on an arc approximately in line with the tie rod while the steering arm of the innermost wheel moves on an arc more obliquely inclined to the tie rod. As a result, the innermost wheel rotates through a greater angle than the outermost wheel as required for ideal steering.

However, the angle of rotation of the innermost wheel is limited in order to prevent the steering arm thereof taking up a position in alignment with the tie rod. This limitation, while of little significance on high speed automobiles is detrimental to the application of this linkage to agricultural implements, or other industrial machines requiring a small turning circle.

The requirements of the steering linkage for agricultural implements in particular vary from those of an automobile due to the wide track of the steerable wheels and the small turning circle necessary to allow the implement to correctly follow the tractor which, as a result of its short wheel-base, has a small turning circle.

Also, it is common for the front steerable wheels of implements, particularly ploughs, to be offset from one another in the direction of straight-ahead travel. Implements are usually turned in only one direction during working, and in implements with offset wheels, turning is in the direction of the rearmost wheel. A small turning circle is possible if the wheel on the side of the implement to which the implement usually turns, rotates through a greater angle when turning towards that side, before alignment of the tie rod and steering arm occurs. Usually, the right front wheel is disposed forward of the left front wheel.

When turning away from the rearmost wheel, it is desirable for the angle of rotation to be smaller than is occasioned by co-axial front wheels, to eliminate scuffing.

This required characteristic cannot be obtained with the normal "Ackerman Steering," for to accommodate the large angle of rotation, when turning in the usual direction, the left hand wheel steering arm must be set at an angle outwards from the normal to the wheel axes of the steerable wheels and, consequently, when turning right, the steering arm pivot, instead of moving along an arc in line with the tie-rod, moves along an oblique arc causing a greater angle of rotation rather than less as would be required, as aforesaid leading to scuffing of the tires when not turning in the usual direction.

It is, therefore, the principal object of the present invention to provide a steering linkage for a wheeled vehicle having steerable wheels which will enable the correct steering movement to be imparted to the wheels during turning of the vehicle and thereby eliminate scuffing of the tires and allow a smaller turning circle.

It is a further object of the present invention to provide a steering linkage for a wheeled vehicle where a small turning circle is allowed in one direction of turning, than in the other without scuffing of the tires.

With the above stated principal object in view, there is provided according to the present invention a steering linkage for a wheeled vehicle including a pair of wheels each mounted for pivotal steering movement about respective vertical axes, a steering arm connected to each wheel to move in unison therewith about its pivot axis, and a fixed length tie rod pivotally connecting each steering arm, wherein at least one steering arm is of variable length and the connection between the or each variable length steering arm and the tie rod is arranged whereby the length of said steering arm is increased as the included angle between said steering arm and tie rod decreases.

More specifically, there is provided according to the invention a steering linkage for wheeled vehicles including a pair of wheels each mounted for pivotal steering movement about respective vertical axes, comprising a fixed length steering arm connected to one wheel to move in unison therewith about its pivot axis, a variable length steering arm connected to the other wheel to move in unison therewith about its pivot axis, and a fixed length tie rod pivotaly connected to each steering arm, the connection between the variable length steering arm and the tie rod being arranged to increase the length of said steering arm as the included angle between said steering arm and tie rod decreases.

If the steerable wheels are offset from one another in the normal direction of travel, then the variable length steering arm is connected to the rear-most wheel.

Conveniently, the variable length steering arm is of a telescopic construction with the first section fixed to the wheel and the second section pivotally connected at the outer end to the tie rod. A rigid link is pivotally connected to the first section of the steering arm and to the tie rod at a location spaced from said pivotal connection to the second section of the steering arm. The relative arrangement of the pivot connections between the rigid link, the steering arm and the tie rod determines the precise steering geometry obtained but, under all circumstances, the length of the steering arm will increase as the included angle between the steering arm and tie rod decreases.

In particular, the included angle made by the variable length steering arm and the line joining the pivot axes of the wheels is greater than the corresponding angle made by the fixed steering arm.

The above described steering linkage enables the required variation in steering movement between the staggered front wheels of an implement while allowing the repositioning of the adjustable steering arm with respect to the normal of the centre line of the wheel pivots to ensure the correct steering thereof to be obtained, and furthermore, the turning circle is sufficiently small irrespective of the width of the track of the front wheels, within reasonable limits.

The invention will now be described in more detail having reference to the accompanying drawings in which:

FIGURE 1 shows a perspective view of the telescopic steering arm and tie rod with connections for use on an agricultural implement.

FIGURE 2 shows a plan view of the telescopic steering arm and tie rod with connections.

FIGURE 3 schematically shows the geometry of a steering linkage incorporating a telescopic steering arm.

FIGURE 4 shows the geometry of a steering linkage in which each steering arm is telescopic.

In one practical arrangement, the steering linkage is applied to a plough having one or more rear wheels mounted for rotation about a common axis transverse to the normal direction of travel of the plough. The front wheels comprise the conventional forward furrow wheel and land wheel arranged with their axes spaced apart in the direction of travel so that the furrow wheel is in advance of the land wheel.

The front furrow and land wheels are mounted to the frame of the plough for relative angular movement about respective vertical axes and a fixed length steering arm is rigidly fixed to the front furrow wheel so that, when the plough is travelling in a straight line, the steering arm projects inwardly of the plough relative to the normal of the pivot axis of the furrow wheel.

Referring to FIGURES 1 and 2 in particular, the front land wheel 1 is provided with a telescopic steering arm 2 having an outer section fixed to the wheel pivot 3 and an inner section 4 slidable within guides 5 provided within the outer section 3. A tie rod 6 is pivotally connected to the end of each steering arm remote from the respective wheel pivots (the connection to the furrow wheel is well known and not shown) and a rigid constraining link 7 is pivoted to the outer section 3 of the steering arm 2 of the land wheel 1 at pivot connection 8 and to the tie rod 6 at pivot connection 9 spaced from pivot connection 8.

When the front wheels are in the normal straight ahead position, referring to FIGURE 3, the telescopic steering arm 2 on the land wheel 1 projects slightly outwardly from the normal of the pivot axis of the land wheel so as to extend away from the right or furrow wheel.

With the above described construction, movement of the steering arm of the front furrow wheel (not shown) in a clockwise direction will effect movement of the steering arm 2 of the land wheel 1 in the same direction and a reduction in the included angle of between the steering arm 2 and the tie rod 6 with a resultant increase in the length of the steering arm L2. Accordingly, the angle of rotation $h$ of the steering arm 2 on the land wheel 1 will be less than that on the furrow wheel (not shown). However, when the steering arm and the furrow wheel are moved in the anti-clockwise direction from the normal straight ahead position the telescopic steering arm 2 on the land wheel 1 will move in the same direction and undergo a reduction in length L1 so that the angle of rotation $g$ of the land wheel steering arm 2 will be greater than that of the furrow wheel.

These variations in movement of the two wheels comply with the requirements for correct steering of an implement in which the steered wheels are staggered in the direction of travel and where one of the steering arms are repositioned in order to gain a greater angle of rotation of the steered wheel before over-centre of the steering linkage takes place, and thus scuffing of the tires during turning in either direction is eliminated.

In a modification of the invention, each of the steering arms is telescopic as shown in schematic form in FIGURE 4 and may have similar angular relations between the various links as that for "Ackerman Steering." In operation, it will be understood that according to the invention the length of the extensible steering arm which is, for the moment, on the outer track of a turning circle will be increased in length as the included angle between the arm 2 and the tie rod 6 decreases, whilst the other steering arm is decreased correspondingly in length along with an increase in the included angle between the arm and the tie rod.

Accordingly, for any given dimension in components, the turning circle obtained will be smaller than that obtainable with known steering linkages.

What I claim is:

1. A steering linkage for wheeled vehicles including a pair of wheels each mounted for pivotal steering movement about respective vertical axes, comprising a fixed length steering arm connected to one wheel to move in unison therewith about its pivot axis, a variable length steering arm connected to the other wheel to move in unison therewith about its pivot axis, and a fixed length tie rod pivotally connected to each steering arm, the connection between the variable length steering arm and the tie rod being arranged to increase the length of said steering arm as the included angle between the said steering arm and tie rod decreases.

2. A steering linkage according to claim 1, wherein the variable length steering arm is of a telescopic construction having one section fixed to said wheel and a second section pivotally connected to the tie rod and a rigid link is pivotally connected to said one section and to the tie rod at a location spaced from said pivotal connection of the tie rod to said second section.

3. A steering linkage according to claim 1, wherein the steered wheels are spaced apart in the direction of travel.

4. A steering linkage according to claim 1, wherein the variable length steering arm extends away from said other wheel in the straight ahead position.

5. A steering linkage according to claim 1, wherein said fixed length steering arm extends towards the said one wheel in the straight ahead position.

6. A steering linkage for wheeled vehicles including a pair of wheels each mounted for pivotal steering movement about respective vertical axes, comprising a fixed length steering arm connected to one wheel to move in unison therewith about its pivot axis, a variable length steering arm connected to the other wheel to move in unison therewith about its pivot axis, and a fixed length tie rod pivotally connected to each steering arm, the connection between the variable length steering arm and the tie rod being arranged to increase the length of said steering arm as the included angle between the said steering arm and tie rod decreases, wherein the included angle made by the variable length steering arm and the line joining the pivot axes of the wheels is greater than the corresponding angle made by the fixed steering arm.

7. A steering linkage according to claim 6, wherein the variable length steering arm is of a telescopic construction having one section fixed to said wheel and a second section pivotally connected to the tie rod and a rigid link is pivotally connected to said one section and to the tie rod at a location spaced from said pivotal connection of the tie rod to said second section.

8. A steering linkage according to claim 6, wherein the steered wheels are spaced apart in the direction of travel.

9. A steering linkage according to claim 6, wherein the variable length steering arm extends away from said other wheel in the straight ahead position.

10. A steering linkage according to claim 6, wherein said fixed length steering arm extends towards the said one wheel in the straight ahead position.

11. A steering linkage for wheeled vehicles including a pair of wheels each mounted for pivotal steering movement about respective vertical axes and spaced apart in the direction of travel, a steering linkage for wheeled vehicles including a pair of wheels each mounted for pivotal steering movement about respective vertical axes, comprising a fixed length steering arm connected to one wheel to move in unison therewith about its pivot axis, a variable length steering arm connected to the other wheel to move in unison therewith about its pivot axis, and a fixed length tie rod pivotally connected to each steering arm, the connection between the variable length steering arm and the tie rod being arranged to increase the length of said steering arm as the included angle between the said steering arm and tie rod decreases, wherein the variable length steering arm is of a telescopic construction having one section fixed to said wheel and a second section pivotally connected to the tie rod and a rigid link is pivotally connected to said one section and to the tie rod at a location spaced from said pivotal connection of the tie rod to said second section.

12. A steering linkage according to claim 11, wherein the variable length steering arm is connected to the rearmost steered wheel.

13. A steering linkage according to claim 11, wherein the variable length steering arm extends away from said other wheel in the straight ahead position.

14. A steering linkage according to claim 11, wherein said fixed length steering arm extends towards the said one wheel in the straight ahead position.

References Cited

UNITED STATES PATENTS

| | | |
|---|---|---|
| 316,392 | 4/1885 | Penney. |
| 748,930 | 1/1904 | Collins _____ 280—93 |
| 951,121 | 3/1910 | Hoisington. |
| 976,188 | 11/1910 | Krug _____ 172—423 |
| 1,668,301 | 5/1928 | Andrews _____ 172—289 X |
| 1,915,816 | 6/1933 | Cole _____ 280—95 |
| 2,205,403 | 6/1940 | Frank _____ 280—87 |
| 2,699,954 | 1/1955 | Harris et al. _____ 280—95 |

FOREIGN PATENTS 514,810  2/1955  Italy.

KENNETH H. BETTS, Primary Examiner

U.S. Cl. X.R.

172—288; 280—95